United States Patent [19]

Vaughn

[11] Patent Number: 4,592,635
[45] Date of Patent: Jun. 3, 1986

[54] POWER HANDLE FOR ELECTRONIC FLASH UNIT AND REMOTE SHUTTER RELEASE DEVICE

[76] Inventor: Buddy W. Vaughn, P.O. Box 11573, Louisville, Ky. 40211

[21] Appl. No.: 737,778

[22] Filed: May 28, 1985

[51] Int. Cl.⁴ .................. G03B 15/05; G03B 17/38
[52] U.S. Cl. .................................... 354/133; 354/266
[58] Field of Search ............... 354/131, 133, 266, 269

[56] References Cited

U.S. PATENT DOCUMENTS 2,418,714  4/1947  Jacobson et al. .................. 354/133

Primary Examiner—Michael L. Gellner
Attorney, Agent, or Firm—Richard L. Caslin

[57] ABSTRACT

A battery power handle is shown for use with a photographic camera, and it is provided for use with an electronic flash unit as well as a remote shutter release device that is capable of being fastened to the shutter release button of the camera. When the power handle energizes the shutter release device, it trips the camera. The power handle includes a hollow housing containing a plurality of batteries that are joined in series-parallel circuit. The top of the power handle includes a wiring compartment having an electrical connector on its top wall for receiving and holding a mating electrical connector of a standard electronic flash unit that may be attached thereto. The wiring compartment includes a printed circuit board having a DC-to-DC inverter circuit to step up the low voltage DC from the batteries into high voltage DC to power the flash unit.

4 Claims, 12 Drawing Figures

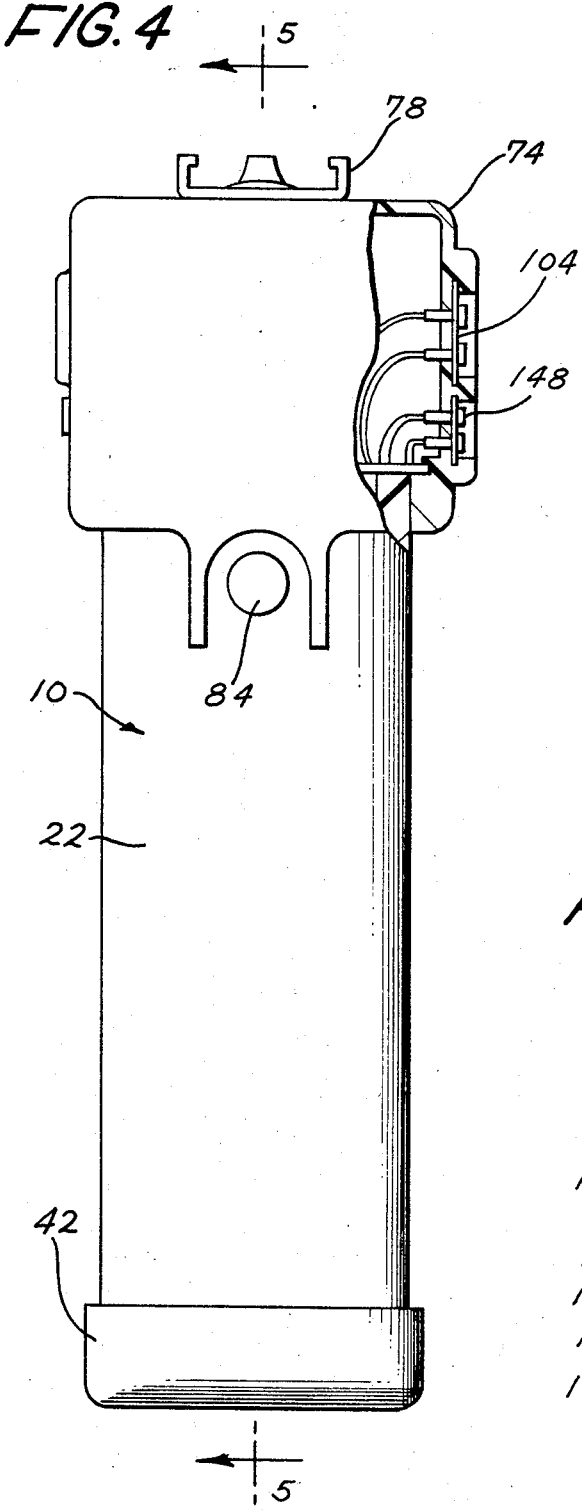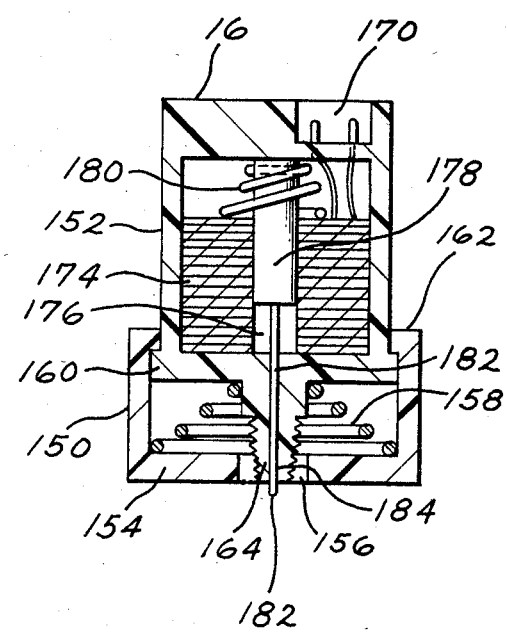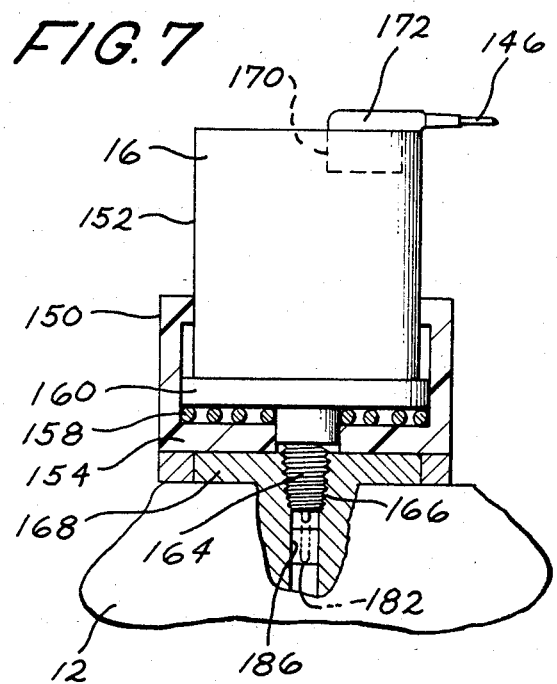

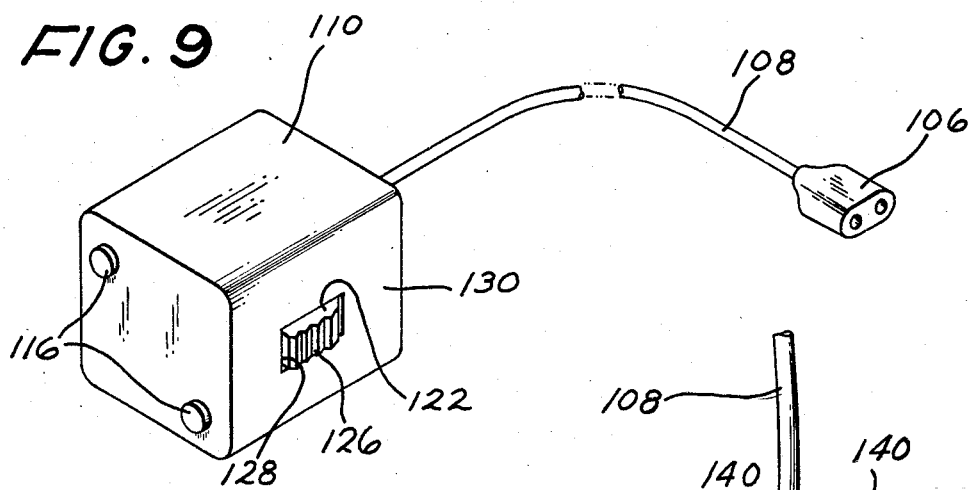
FIG. 9
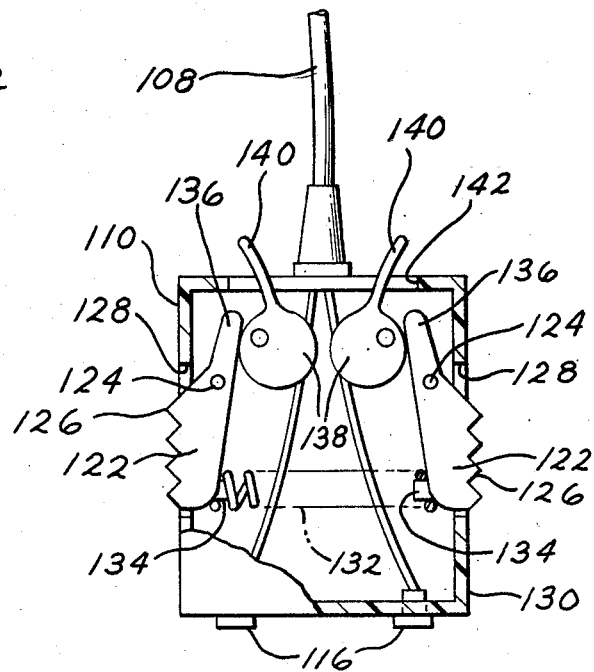
FIG. 10
FIG. 11
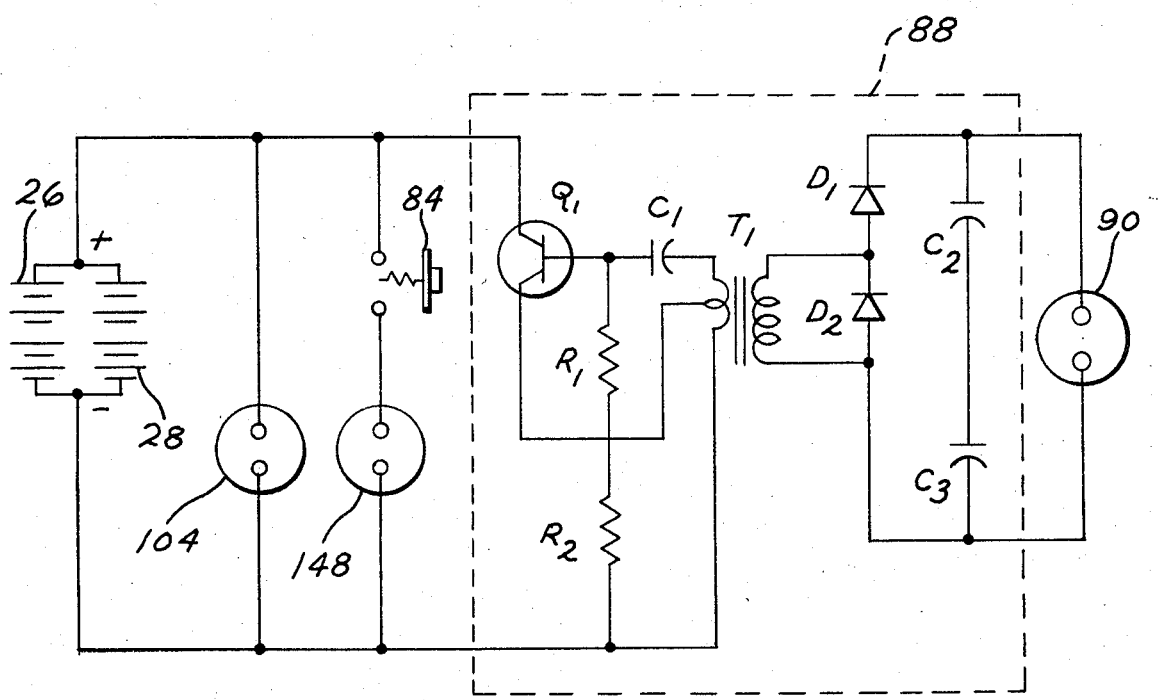

POWER HANDLE FOR ELECTRONIC FLASH UNIT AND REMOTE SHUTTER RELEASE DEVICE

BACKGROUND OF THE INVENTION

1. Field of the Invention

This invention relates to accessories for photographic cameras and, particularly, to a portable battery power handle that furnishes power to a standard electronic flash unit and to a remote camera shutter release device.

2. Description of the Prior Art

The following patents were found during a search of the prior art. The Helber et al U.S. Pat. No. 3,357,332 describes a photographic camera release and time exposure device that has a push rod which acts upon the shutter of the camera in order to obtain comparatively long exposure times when the camera is set to its "B" setting. The device is provided with a spring driven, manually settable mechanism which can be preset for different running times. A lock is engageable with the push rod to hold the push rod in a release position. This patent does not relate to power systems for electronic flash units for cameras but merely to the remote operation of the shutter release button of the camera.

The Fahlenberg et al U.S. Pat. No. 3,526,180 describes a photographic camera having an interchangeable shutter, at least one variable factor or value of which is settable by electronic control means mounted externally of the shutter and adaptable to be used with any one of the various interchangeable shutters. Again, this patent does not relate to portable battery power handles for flash units for use with photographic cameras.

The Raab U.S. Pat. No. 3,590,717 describes a shutter control member on a detachable camera objective which is actuated by the closure of a switch upon the depression of a shutter-trip button on the camera. This switch energizes an electromagnet on the objective which moves the control member into contact with an adjustable abutment to establish a preselected shutter aperture. Again, this patent does not relate to portable battery supply handles for use with electronic flash units in combination with the remote control of a shutter release solenoid that is attached to the camera.

The Kawamura U.S. Pat. No. 4,167,317 describes a shutter release mechanism provided in a camera which includes an electromagnetic circuit in which an electric power source, an electromagnet for operating a shutter, and an actuating switch are operatively interconnected. Again, this patent does not include any portable flash unit in combination with the shutter release solenoid as taught by the present invention.

SUMMARY OF THE INVENTION

The present invention provides a battery power handle for use with an electronic flash unit and a shutter release device. This power handle has a hollow, elongated housing containing a plurality of dry cell batteries that are connected in series-parallel circuit. The top end of the power handle includes a hollow wiring compartment that is closed at the top and is furnished with an electrical connector or hot shoe for receiving and holding a mating electrical connector of a standard electronic flash unit that is attached to the top of the power handle. The wiring compartment is furnished with a printed circuit board having a DC-to-DC inverter circuit to step up the low voltage DC from the batteries into high voltage DC to power the flash unit. The wiring compartment of the power handle is fitted with a removable low voltage cable that is attached to the shutter release device at one end and to the power handle at the other end.

BRIEF DESCRIPTION OF THE DRAWING

This invention will be better understood from the following description taken in conjunction with the accompanying drawings, and its scope will be pointed out in the appended claims.

FIG. 4 is a front elevational view of the power handle of FIG. 1 with the upper part broken away to be in cross-section to show first, a low voltage receptacle for receiving a low voltage cable that is connected to a dummy battery replacement module fitted into the battery compartment of the flash unit in place of the normal batteries, and a second low voltage receptacle for receiving a low voltage cable that is connected to the shutter release solenoid attached to the camera.

FIG. 7 is a fragmentary elevational view, partly in cross section, showing the interconnection of the shutter release solenoid to the shutter release button of the camera.

FIG. 8 is a cross-sectional elevational view of the shutter release solenoid of FIG. 7 shown in its normal at-rest position before the solenoid is fastened to the shutter release button of the camera.

FIG. 9 is a perspective view of the dummy battery replacement module that is adapted to be fitted into the battery compartment of the flash unit, and this module is fitted with a low voltage cable that is adapted to be attached to the low voltage receptacle in the wiring compartment of the power handle, as seen in FIGS. 1 and 4.

FIG. 10 is a cross-sectional fragmentary view of the dummy battery replacement module of FIG. 9 showing its interior construction and, particularly, the side locking means and the cam release means for use in removing the module from the flash unit.

FIG. 11 is a schematic wiring diagram showing certain elements of the battery power handle and, particularly, the DC-to-DC inverter circuit that is provided on a printed circuit board that is assembled within the wiring compartment at the top of the power handle so as to raise the 6-volt DC power supply to generally 150 to 175 DC for operation of the electronic flash unit.

DESCRIPTION OF THE PREFERRED EMBODIMENTS

Figure 1:
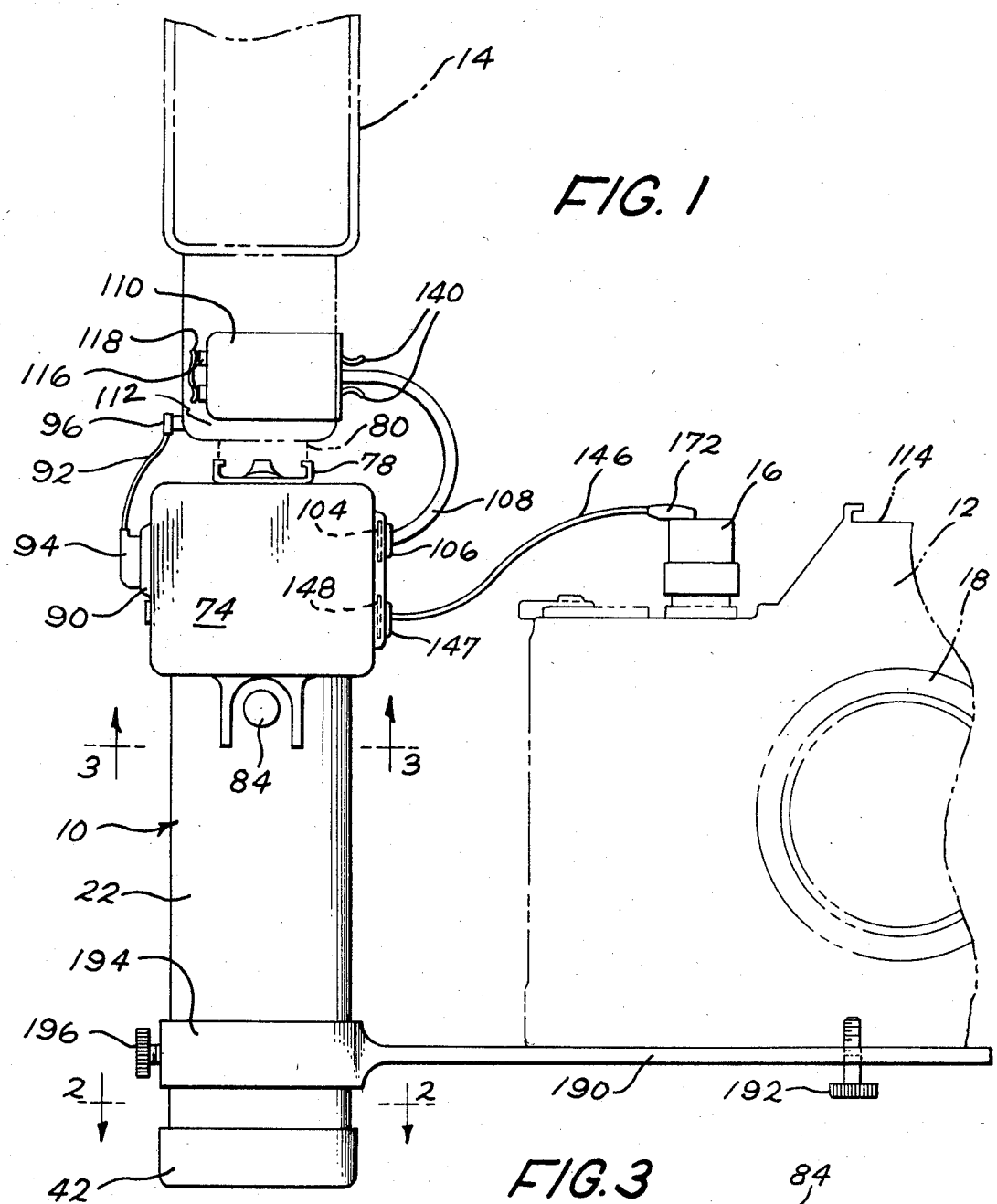
FIG. 1 is a front elevational view of the power handle of the present invention shown supported from a photographic camera that is illustrated in phantom lines, where the battery power handle supports a standard electronic flash unit on the top end thereof, and the power handle carries a low voltage cable having furnished on the end thereof a shutter release solenoid that is adapted to be mounted to the shutter release button of the camera.

Turning now to a consideration of the drawings and, in particular, to the front elevational view of FIG. 1, there is shown a battery power handle 10 embodying the present invention for use with a conventional photographic camera 12, which is shown in phantom lines, as the camera per se does not form part of the present invention. Mounted to the top of the battery power handle 10 is a standard electronic flash unit 14, which is carried as part of the power handle. Also associated with the power handle 10 is a shutter release solenoid 16 which is capable of being mounted to the shutter release button of a standard 35 mm camera 12. This camera has a lens 18 which is also shown in phantom lines.

For a better understanding of the details of construction of the power handle 10, reference will now be made to FIGS. 5 and 6 of the drawings. The battery power handle 10 is formed of a hollow, elongated housing 22 that is molded of suitable plastic material. The bottom end 24 of the housing is open so that two sets of four AA batteries 26 and 28 can be loaded into this housing in a series-parallel circuit to provide the high voltage power for the flash unit 14 as well as low voltage power for the shutter release solenoid 16. The upper set of four batteries is identified as 26, while the lower set of four batteries is identified as 28. As noted earlier, FIG. 6 is a rear view of the power handle 10, and, thus, it can be seen that all four of the front batteries are positioned in the upright position with the positive terminal 30 at the top thereof.

Figure 5:
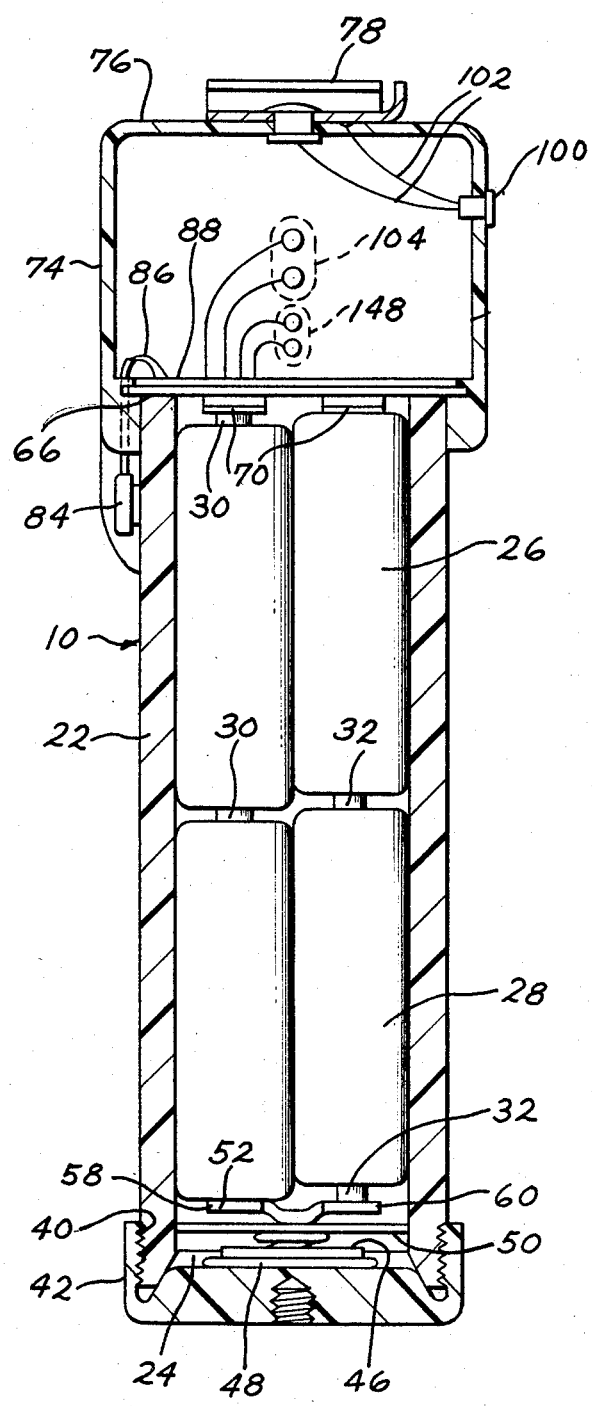
FIG. 5 is a fragmentary, left side, cross-sectional, elevational view of the power handle, taken on the Line 5—5 of FIG. 4, showing the nature of the eight AA batteries that are positioned within the power handle in a series-parallel circuit, as well as the location of the printed circuit board within the wiring compartment at the top end of the power handle and the various electrical connections.

Now, looking at the left side, cross-sectional, elevational view of FIG. 5 of the power handle, it will be seen that the rear batteries of both the top set 26 and the bottom set 28 are in an inverted position with the positive terminal 32 at the lower end of the inverted battery.

Figure 2:
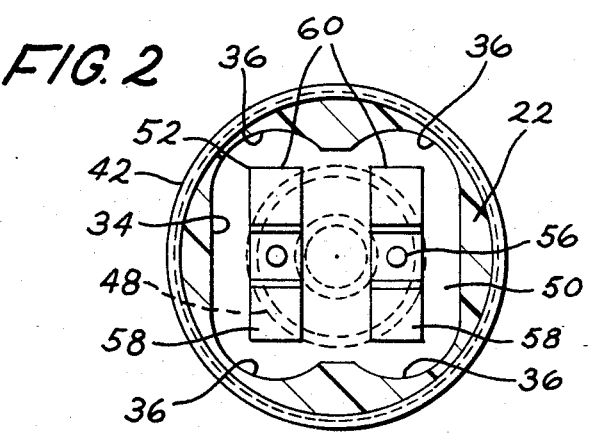
FIG. 2 is a cross-sectional plan view, taken on the Line 2—2 of FIG. 1, showing the details of construction of the lower end of the power handle and the removable cap.

FIG. 2 is a cross-sectional plan view through the hollow, cylindrical battery housing 22, taken on the Line 2—2 of FIG. 1, and it will be noted that the interior of this housing 22 is not circular, but rather it has an irregular interior surface to define a generally square, transverse cross section 34 with four semi-circular pockets 36 which run nearly the complete length of the housing so that the two sets of four AA dry cell batteries can only fit into this housing in a certain manner.

Figure 12:
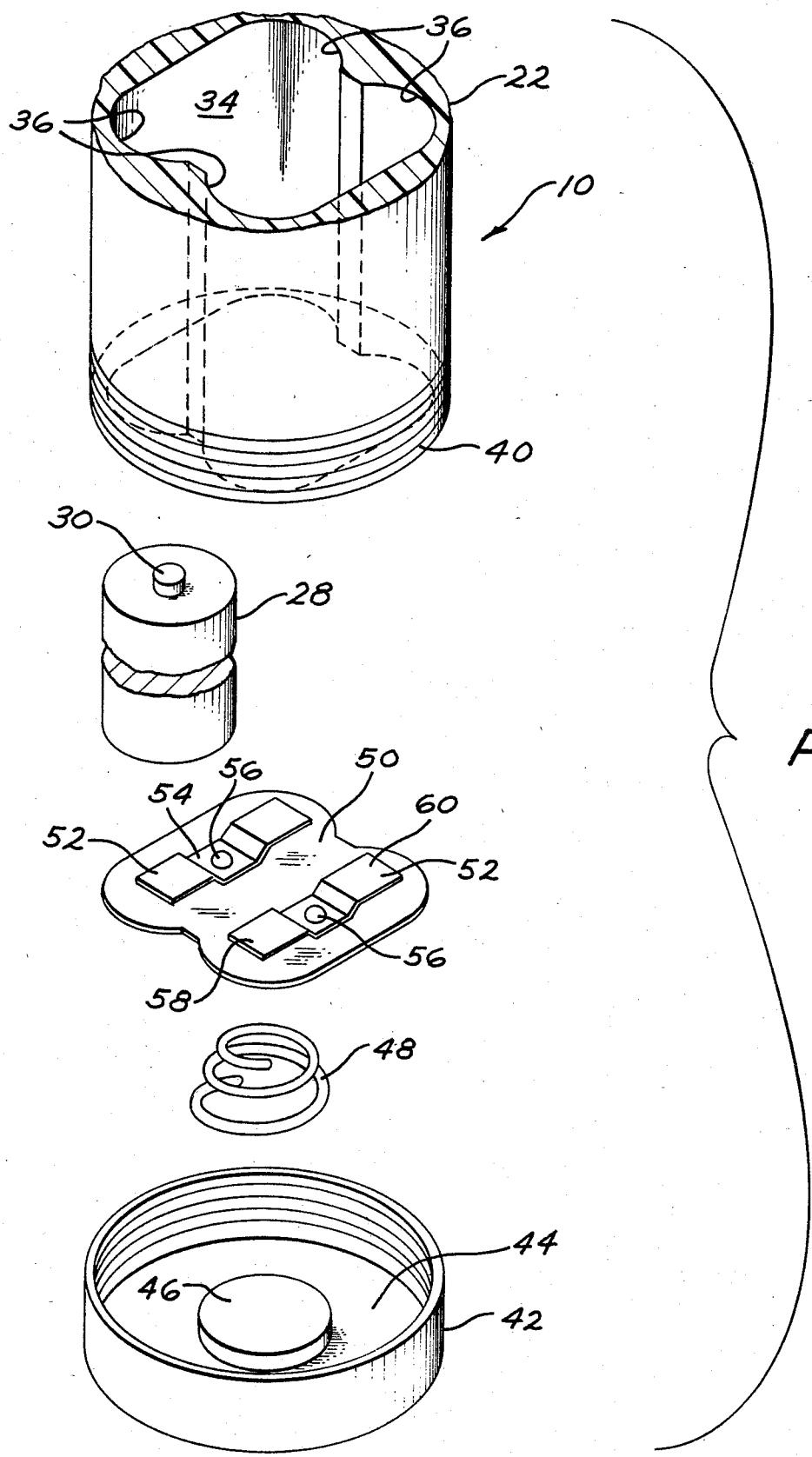
FIG. 12 is a fragmentary perspective view of the threaded cap at the bottom of the power handle showing its relationship with a battery contact supporting plate.

Now, attention will be directed to FIGS. 2, 5 and 12 of the drawings. The bottom end 24 of the housing 22 has external threads 40 for receiving a threaded cap 42 which is assembled to the bottom of the housing to retain the batteries 26 and 28 therein, similar to that of a portable flashlight construction. One important difference, however, is that the usual flashlight has a pair of batteries arranged in tandem, while the present invention, as illustrated, uses a total of eight AA batteries, and electrical contact has to be made to each of them. As seen in FIG. 12, the interior of the bottom wall 44 of the threaded cap 42 has a circular center post 46 over which is fitted a tapered helical compression spring 48. This spring 48 is for engaging the underside of a battery contact supporting plate 50 which has generally the same outer configuration as the interior configuration 34 of the housing 22, as is best seen in FIG. 2. This supporting plate 50 is fitted with a pair of generally parallel spring contact blades 52 which make a series connection between the 4 batteries of the lower set 28. Each blade 52 has a central mounting portion 54 that is provided with a hole for receiving a fastening rivet 56 that attaches each blade 52 to the supporting plate 50. The opposite ends 58 and 60 of each blade are formed upwardly to be spaced above the supporting plate 50 in order to provide a cantilever spring action against one of the batteries, as best seen in the cross-sectional, left side elevational view of FIG. 5.

Figure 3:
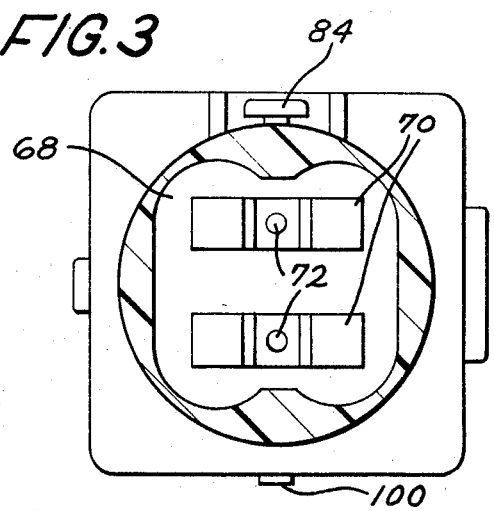
FIG. 3 is a bottom plan view, taken on the Line 3—3 of FIG. 1, illustrating the details of construction of the upper end of the elongated hollow housing for supporting the plurality of batteries in the power handle.

Now, looking at FIG. 3, this is a bottom, cross-sectional plan view of the battery housing 22, taken on the Line 3—3 of FIG. 1. This FIG. 3 should also be considered in conjunction with FIGS. 5 and 6 which shows that the top end 66 is closed by a cover plate 68, on the underside of which is mounted a pair of spring contact blades 70, which are similar in construction to the first pair of spring contact blades 52, except they are set in a perpendicular relationship to the blades 52, as is best seen by comparing FIGS. 2 and 3. Fastening rivet 72 holds each blade 70 to the cover plate 68.

It will be understood by those skilled in this art that the power handle 10 is constructed to hold low voltage dry cell batteries, which could either be AA batteries, C batteries, D batteries, or a 9-volt radio battery. Of course the power handle would have to be modified to accomodate any batteries other than the AA batteries. The particular battery arrangement, as illustrated in FIGS. 5 and 6, provide 6-volt DC having twice the normal current capacity as is available in the usual electronic flash unit such as 14 that in the present invention is mounted to the top of the power handle 10.

The top end of the elongated housing 22 is fitted with a hollow wiring compartment 74, and it has a closed top wall 76 on which is mounted an electrical connector 78 that is designed to receive and hold a mating electrical connector 80 on the lower end of the electronic flash unit 14. This type of electrical connector 78 is sometimes referred to as a "hot shoe" type attachment in the art of cameras. The front of the power handle 10 is furnished with a camera-operating switch 84 which is furnished with lead wires 86 that extend into the wiring compartment 74 and are connected to a printed circuit board 88 that is mounted to the cover plate 68, as best seen in FIG. 5. The electrical components on this printed circuit board 88 are best illustrated in the schematic wiring diagram of FIG. 11. This electronic circuit is a generally standard DC-to-DC inverter circuit that is capable of converting the 6-volt DC from the batteries 26 and 28 into high voltage, between 150 volts and 175 volts, for energizing the electronic flash unit 14. This inverter circuit can handle approximately 350 ma of current. This inverter circuit includes a power transistor $Q_1$, a pair of resistors $R_1$ and $R_2$, and three capacitors $C_1$, $C_2$ and $C_3$. There is also a transformer $T_1$ and a pair of diodes $D_1$ and $D_2$. This inverter circuit supplies high voltage to the high voltage receptacle 90 that is located on the left side of the wiring compartment 74, as it is seen in FIG. 4. A high voltage cable 92 has a plug 94 at one end that is adapted to engage in the receptacle 90, and a plug 96 at its opposite end that is inserted into a mating receptacle in the lower end of the electronic flash unit 14. Thus, this power handle 10 is capable of supplying high voltage DC to the flash unit 14 so as to avoid the inconvenience of having to allow the electronic flash unit to charge its capacitors in-between flashes, as is necessary when using low voltage power for the flash unit 14.

Figure 6:
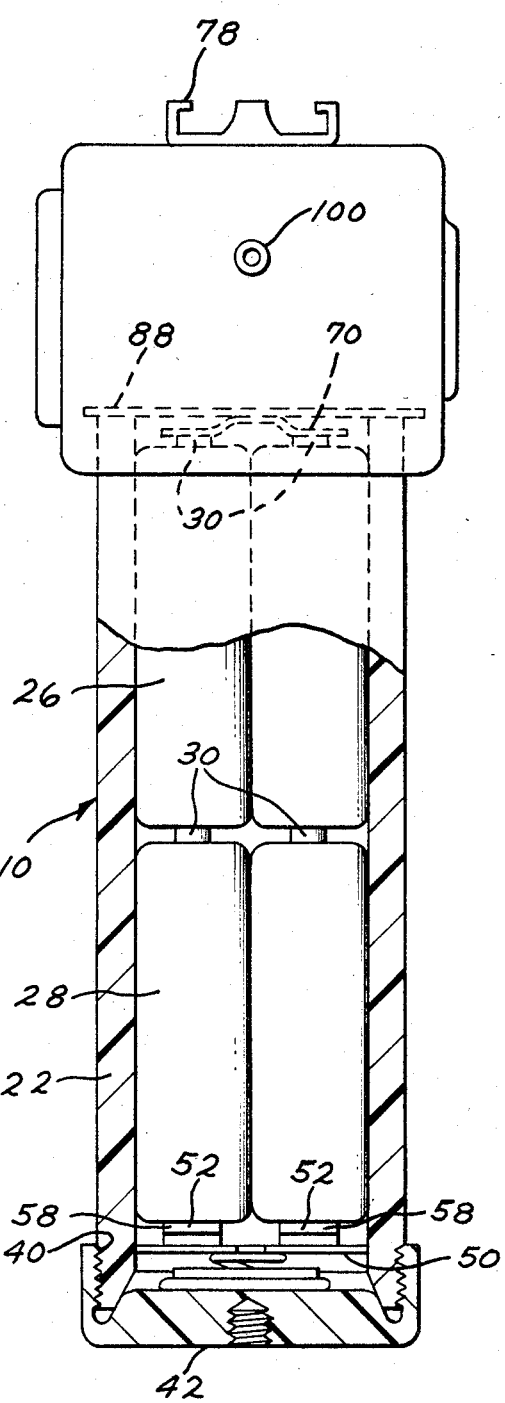
FIG. 6 is a fragmentary rear view of the power handle of FIG. 4, with parts broken away and others in cross section, to show the upper and lower sets of batteries and how they are interconnected at both the top and the bottom portions of the battery housing.

As seen in both FIGS. 5 and 6, the rear wall of the wiring compartment 74 is furnished with a test switch 100 for the flash unit 14 which bypasses both the power of the power handle and the camera, and it does not necessarily use film when confirming that the flash unit is capable of operation. Notice, in FIG. 5, that this test switch 100 is furnished with lead wires 102 that are connected to the electrical connector or hot shoe 78, at the top of the power handle, that engages a mating connector on the bottom of the flash unit 14. This test switch 100 serves to short out the hot shoe and causes the flash unit to flash. This test switch 100 is not illustrated in the circuit diagram of FIG. 11 because it is merely a shorting switch and is not connected in the circuit of FIG. 11.

Looking at the front view of the power handle 10 of FIG. 4, there is a low voltage receptacle 104 positioned in the right side of the handle. This low voltage receptacle 104 is designed to receive the plug 106 of a low voltage cable 108 that has, on its opposite end, a dummy battery replacement module 110, as is best seen in FIG. 9. Now, looking at the front elevational view of FIG. 1, the lower end of the electronic flash unit 14 is fitted with a battery compartment 112 that normally would contain four AA batteries if, for example, the flash unit 14 were to be connected directly to the camera 12 by means of the electrical connector 114 or hot shoe shown formed on the top of the camera. This dummy battery replacement module 110 has two terminals 116 which are adapted to engage the spring contacts 118 within the battery compartment 112; thereby providing 6-volt DC for the flash unit 14 with twice the current capacity.

Turning to FIGS. 9 and 10 of the drawings, this dummy battery replacement module 110 is shown as having two springbiased, pivoted latch members 122 which are located on the opposite sides of the module and are adapted to exert a wedging force against the opposite interior walls of the battery compartment 112 so that the module will stay in place. Each latch member 122 has a central pivot pin 124 and a notched gripping face 126 that is adapted to swing through a window 128 in the sidewall 130 of the module housing. A compression spring 132 is positioned between each latch member 122 in the area behind the notched gripping face 126 for urging the latch members outwardly. Each latch member includes a locating pin 134 over which one end of the compression spring 132 is fitted so that the spring does not slip out of position. The opposite end of each latch member 122 includes a lever arm 136 which cooperates with a pivoted cam member 138. Each cam member has a pinch plate 140 which extends outwardly through a slot 142 in the housing of the module. Hence, the user may withdraw the module 110 from the battery compartment 112 by first squeezing the pinch plates 140 together which causes the latch members 122 to pivot inwardly and withdraw the notched gripping faces 126 from engagement with the opposite interior walls of the battery compartment. Then, it is an easy matter to remove the module from the flash unit when dissassembling the apparatus for storage.

As mentioned earlier with relation to FIG. 1, the camera 12 is fitted with a shutter release solenoid 16. This shutter release solenoid is fitted with a low voltage cable 146 that has a plug 147, that fits into a low voltage receptacle 148 at the side of the wiring compartment 112 on the power handle 10.

Looking at FIGS. 7 and 8 of the drawings, the shutter release solenoid 16 comprises two telescopic housings: namely, a bottom housing 150 and a top housing 152. The bottom wall 154 of the bottom housing has a central opening 156, and this bottom wall supports a conically shaped compression spring 158. The lower end 160 of the top housing 152 is supported within the interior of the bottom housing and is captured therein by means of the inwardly extending ledge 162. The bottom end 160 of the top housing also has a downwardly extending, threaded plug member 164, which extends through the center of the compression spring 158 and is capable of being threaded into a mating socket 166 in a shutter release button 168 of the camera 12 as seen in FIG. 7. Thus, in order to assemble the shutter release solenoid 16 to the camera, the top housing 152 is depressed against the action of the spring 158 so that the threaded plug 164 extends out through the opening 156, and then the solenoid is turned to thread the plug 164 into the socket 166. In the final assembled position of FIG. 7, the compression spring 158 is generally flattened, as illustrated.

The top housing 152 of the solenoid 16 includes a low voltage electrical receptacle 170, as seen in FIG. 8, for receiving the mating plug 172 on one end of the cable 146. Within the top housing 152 is an electromagnetic coil 174 that has a hollow core 176 in which is supported an armature 178. The upper end of the armature if fitted with an armature return spring 180 which normally raises the armature 178 to its highest position. When the solenoid is energized, the coil 174 tends to pull the armature 178 downward against the action of the spring 180. The lower end of the armature 178 is fitted with an elongated rod 182 which extends through a mating hole 184 in the bottom end of the top housing as well as through the threaded plug member 164 and out the bottom thereof, as seen in FIG. 8. When the solenoid 16 is energized, the coil 174 lowers the armature 178 causing the elongated rod 182 to project from the bottom of the threaded plug 164 and to depress the movable element 186 of the shutter release button 168 to FIG. 7, thereby releasing the shutter of the camera and exposing the film.

Not shown in the drawings is a standard cable that extends from the camera 12 to the flash unit 14 to synchronize the flash of the flash unit 14 with the opening of the shutter 18 of the camera. Such a synchronizing cable does not form part of the present invention.

Looking back at FIG. 1, the bottom of the camera 12 is fitted with a removable bracket 190 that is held in place by the adjustable fastener 192. The free end 194 of the bracket is formed as a sleeve to receive the lower end of the cylindrical power handle 10 therein, after the threaded cap 42 has been removed. Another adjustable fastener 196 screws into the side of the sleeve 194 in the manner of a set screw to lock the power handle to the bracket.

Modifications of this invention will occur to those skilled in the art. Therefore, it is to be understood that this invention is not limited to the particular embodi-

What is claimed is:

1. A battery power handle for use with a photographic camera for tripping the shutter release button of the camera and energizing a portable flash unit, said power handle comprising:
   a. a hollow elongated housing containing a plurality of dry cell batteries that are connected in series-parallel circuit;
   b. the top end of the elongated housing including a hollow wiring compartment that is closed at the top and is furnished with an electrical connector for receiving and holding a mating electrical connector of a portable electronic flash unit that is attached to the top end of the power handle;
   c. the said wiring compartment including a printed circuit board having a DC-to-DC inverter circuit to step up the low voltage DC from the batteries into high voltage DC to power the said flash unit;
   d. the lower end of the flash unit having a battery compartment, and a dummy battery replacement module fitted into this battery compartment, the said dummy battery module having a cable connected back to the said wiring compartment of the power handle to pick up the low voltage DC from the power handle;
   e. and a removable high voltage cable connected between the wiring compartment of the power handle and the flash unit for furnishing the high voltage DC from the power handle to the flash unit;
   f. the said wiring compartment of the power handle being furnished with a cable of low voltage DC that is connected at its other end to a camera shutter release solenoid that is adapted to be fastened to the shutter release button of the camera;
   g. and a shutter release switch mounted on the exterior of the said power handle so that when it is actuated the camera shutter is released and the flash unit is being simultaneously energized by the high voltage DC furnished from the DC-to-DC inverter circuit of the power handle.

2. The invention as recited in claim 1 wherein the said power handle is furnished with a set of eight AA batteries connected in a series-parallel circuit to furnish 6 volt DC power to both the DC inverter circuit and to the said shutter release solenoid, while the said DC inverter circuit furnishes between 150 to 175 volts DC at about between 350 ma and 500 ma of current for the power available to the flash unit.

3. The invention is recited in claim 2 wherein the said flash unit may be supplied only with the low voltage DC from the batteries in the handle by the disconnection of the said removable high voltage cable.

4. The invention as recited in claim 2 wherein the said eight AA batteries in the power handle are arranged in 2 sets of 4 batteries apiece, one set above the other, where two batteries of each set are arranged right side up and the remaining two batteries of each set are arranged inverted the lower end of the power handle being fitted with a removable cap, the interior of the cap being provided with a compression spring that in turn engages a support plate fitted into the lower end of the power handle in a given position and supporting a pair of parallel spring contact members each in enagement with two of the four batteries of the lower set of batteries to form a series connection, the upper end of the elongated housing having a second pair of parallel spring contact members arranged perpendicular to the direction of the first said pair of spring contact members and each being in engagement with two of the four batteries of the upper set of batteries to form a parallel connection.

* * * * *